No. 740,807. PATENTED OCT. 6, 1903.
J. H. CLUNE.
VALVE.
APPLICATION FILED SEPT. 23, 1901.
NO MODEL.
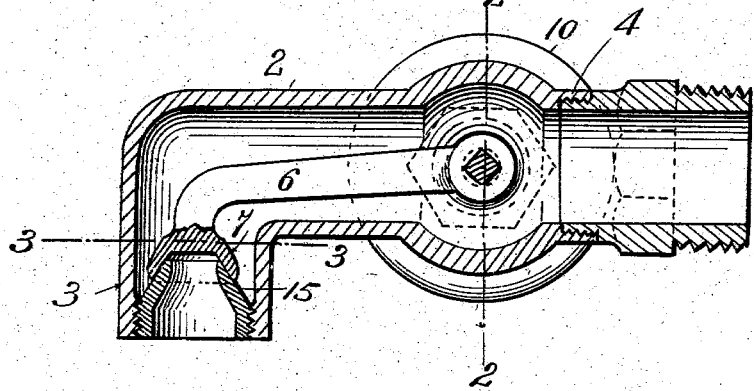
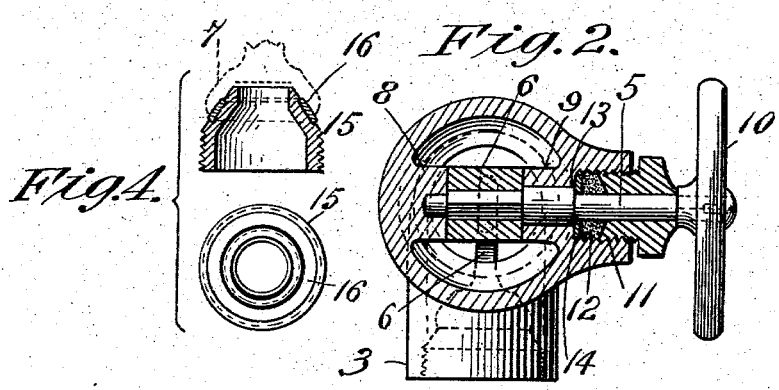
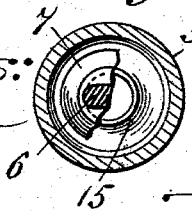
Witnesses: Inventor:
John H. Clune
by Chapin & Co.
Attorneys.

No. 740,807. Patented October 6, 1903.

UNITED STATES PATENT OFFICE.

JOHN H. CLUNE, OF SPRINGFIELD, MASSACHUSETTS.

VALVE.

SPECIFICATION forming part of Letters Patent No. 740,807, dated October 6, 1903.

Application filed September 23, 1901. Serial No. 76,241. (No model.)

*To all whom it may concern:*

Be it known that I, JOHN H. CLUNE, a citizen of the United States of America, residing at Springfield, in the county of Hampden and State of Massachusetts, have invented new and useful Improvements in Valves, of which the following is a specification.

This invention relates to valve construction, and especially to self-closing basin-cocks, the object of the invention being to provide a cock of this type which shall close by the action of the water behind it and which shall be of simple construction and provided with a valve-seat located in or near the end of the nozzle of the cock and removable therefrom from the outside, all as fully set forth and claimed in the following specification.

In the drawings forming part of this specification, Figure 1 is a longitudinal sectional view of a cock constructed according to my invention. Fig. 2 is a cross-section of the same on line 2 2, Fig. 1. Fig. 3 is a section on line 3 3, Fig. 1, showing the valve partly broken away. Fig. 4 is a view of the valve-seat in plan and vertical section and slightly modified in construction.

Referring to the drawings, the body of the cock is indicated by 2 and is of the usual form and is provided with the down-hanging nozzle 3. This body is preferably divided, as at 4, and the two parts screwed together, to the end that after it has been applied to a service-pipe, as it frequently is by being wiped on, the body may be unscrewed for the purpose of removing the valve should occasion arise. If the body be made to screw onto a service-pipe or be secured thereto by a union, the division of the body at 4 would be superfluous.

Transversely of the horizontal axis of the body and at a suitable distance from the nozzle end there is located the stem 5, on which there is non-rotatably secured the arm 6, carrying at its outer free end the valve 7, preferably cast integrally with said arm.

To support the stem 5, I prefer to cast two bosses 8 and 9 on the interior surface of the body 2, one of which, 8, is provided with a socket to receive the inner end of said stem, which is inserted through a hole made through the other boss, 9, from the outside of said body.

Preferably the stem is squared where it receives the arm 6. That part of the stem which projects through the body of the cock to receive a hand-wheel 10 or other handle is provided with a packing-gland 11, made in the usual manner, the nut of which screws into a boss formed on the body and compresses the packing-ring 12 around the stem. That portion of the latter which passes through the gland 11 is turned down to a smaller diameter than that part located in the boss 9, whereby a shoulder 13 is formed thereon, and before the packing is put in place a metal washer 14 is slipped onto the stem to bear against said shoulder, being held thereagainst by the nut of said gland to prevent endwise movement of the stem in one direction.

The seat for the valve is indicated by 15 and preferably is made cone-shaped, as shown, and is screwed or otherwise removably secured in or near the end of the nozzle of the cock. The valve 7 is turned out on its under side to conform to the taper of the seat 15, and the transverse diameter of the valve is such as to leave only a comparatively narrow water-passage around said valve. Furthermore, the arm 6 is so proportioned that when it is manipulated to raise the valve from its seat the former cannot be raised far enough to take it out of the current of water flowing through the nozzle, to the end that when the arm is released the water-pressure on the upper side thereof will always cause the valve to close.

Instead of making a tapered fit between the seat and the valve the seat may be fitted with a ring-seat 16, as shown in Fig. 4, which may be made of softer material than said tapered seat, or, if desired, the seat may be horizontal, as in the ordinary globe-valve.

Having thus described my invention, what I claim, and desire to secure by Letters Patent of the United States, is—

1. In a basin-cock having the usual down-hanging nozzle, a valve movable vertically in the latter, a valve-seat secured to or near the end of the nozzle below the valve, a curved arm on which the valve is supported extending back into the body of the cock, a valve-stem extending through the side of the cock at right angles to said arm, the latter and said stem being secured together to move as one piece.

2. In a basin-cock having the usual downhanging nozzle, a valve-arm pivotally supported in said cock, a valve thereon depending from the end of said arm into the nozzle and vertically movable only within the limits of the latter, and a seat in said nozzle for said valve, substantially as described.

3. In a basin-cock having the usual downhanging nozzle, a valve-arm pivotally supported in said cock, a valve thereon depending from the end of said arm into the nozzle and vertically movable only within the limits of the latter, and a seat in said nozzle for said valve, said seat being removable through said nozzle from outside the cock, substantially as described.

JOHN H. CLUNE.

Witnesses:
H. A. CHAPIN,
K. I. CLEMONS.